Ludwig vonBogdandy
INVENTOR.
BY Karl F. Ross
AGENT.

June 15, 1965  L. VON BOGDANDY  3,189,438
METHOD OF AND APPARATUS FOR REDUCING IRON OXIDES
Filed Nov. 19, 1962  3 Sheets-Sheet 3

INVENTOR:
Ludwig von Bogdandy
BY Karl F. Ross
AGENT.

3,189,438
METHOD OF AND APPARATUS FOR REDUCING IRON OXIDES

Ludwig von Bogdandy, Essen-Frintrop, Germany, assignor to Firma Hüttenwerk Oberhausen AG, Oberhausen, Rhineland, Germany, a corporation of Germany
Filed Nov. 19, 1962, Ser. No. 238,655
Claims priority, application Germany, Nov. 23, 1961, H 44,211
9 Claims. (Cl. 75—34)

My present invention relates to the production of sponge iron from iron oxides and, more particularly, to a method of and an apparatus for reducing such oxides.

In general, iron ores consisting primarily of iron oxide has been reduced to sponge iron in cupola-type reduction furnaces wherein a charge of iron ore is passed countercurrent to a stream of reducing gases. In the commonly assigned copending applications Ser. Nos. 10,124 and 72,069 (now U.S. Patent No. 3,148,050, granted September 8, 1964), filed February 23, 1960, and November 28, 1960, respectively, I disclose a method of and an apparatus for the production of a reducing gas for metallurgical purposes as well as apparatus for reducing iron oxide wherein a continuous conveyor grate carries iron oxide pellets through a reduction chamber wherein they are treated with a reducing gas. For the most part the reducing gas is produced by reformation or "cracking" of a hydrocarbon in the presence of oxygen in a suitable reducing-gas generator. This reducing gas is then passed through the reduction cupola from which an exhaust gas emerges. The exhaust gas has usually been considered unsatisfactory for further use and was, in general, burnt off. It should be noted that a reduction of iron oxide by means of a gas reformed from hydrocarbons and oxygen frequently is unsatisfactory as a consequence of the presence in the reducing gas of oxidizing constituents (e.g. water vapor and carbon dioxide). In fact, the reaction of hydrocarbons in regeneratively heated reducing-gas generators in the presence of oxygen or water vapor has been found to be relatively incomplete in the absence of stoichiometric excess of oxygen or an oxygen-containing reactant. In many cases such excesses were required to eliminate the tendency to produce free carbon or soot. The use of catalysts has also been found to be more or less unsatisfactory as a consequence of the rapid contamination of the catalyst.

It is an object of the present invention to provide an improved plant for reducing iron ores and producing therefrom iron sponge wherein the aforementioned disadvantages are avoided. A corollary object is to provide an economical method for operating an iron-oxide reducing plant of the aforementioned character.

These objects are attained, in accordance with the invention, by the method of treating iron ores in a cupola-type furnace wherein a reducing gas rich in hydrogen and carbon monoxide and substantially totally free from oxidizing agents (e.g. free oxygen, carbon dioxide and water) is reacted with the oxide and wherein the exhaust gas emanating from the cupola is at least partly returned to the reduction-gas generator as one of the reactants employed in the production of this gas. Since the exhaust gas which, heretofore, had been burnt off or otherwise disposed of, consists largely of water vapor and carbon dioxide, it may serve to provide a substantial proportion of the oxygen required to reform or "crack" a hydrocarbon fuel into carbon monoxide and hydrogen. I have found that optimum results are obtained when 60–75% of the exhaust gas (by volume) is fed back to the reducing-gas generator when free oxygen is employed therein to reform the hydrocarbon. The free oxygen may, of course, be in the form of ambient air, air enriched with oxygen or pure oxygen. When, however, the reforming agent is water vapor, only about 20–40% of the effluent exhaust gas is returned to the reduction-gas generator.

According to another feature of the invention the reduction gas is fed into the cupola at a reducing zone somewhat above the exit level at which the sponge iron is removed from the furnace. Part of the exhaust gas fed-back steam may then be diverted from the reducing-gas generator and employed to cool the sponge iron. To this end the cooling gas, which may constitute up to 30% by volume of the feed-back gas stream is introduced into the furnace at said outlet zone, i.e. at a level below the level at which the reducing gas is fed into the furnace. The remainder of the exhaust gas, constituting between 25 and 40% thereof when free oxygen is employed as the reforming media and between 60 and 80% when water vapor is so employed, is regeneratively cycled to a further reducing-gas generator for heating same. The two generators may function alternately to produce the reducing gas so that an uninterrupted operation of the plant results.

It is a more particular feature of the invention to provide the reducing-gas generator with a primary-reaction chamber wherein the fuel and reforming agent are admixed turbulently and, preferably in a cyclonic manner and a secondary-reaction chamber wherein the final reformation of the gas mixture takes place. It is contemplated, according to the invention, to employ for this purpose, a generator of the type shown in the aforementioned copending application Ser. No. 10,124 in which a hydrocarbon fuel and an oxygen-containing reforming medium are introduced tangentially and wherein preliminary combustion of the fuel and oxidation of the carbon contained therein takes place. The fed-back exhaust gas may then be added to the second chamber in which its oxygen is converted, at a temperature of about 1000° C. and preferably thereabove, into carbon monoxide while any hydrogen therein yields molecular hydrogen ($H_2$) which constitutes part of the reducing gas. The exhaust gas may, however, be added directly to the hydrocarbon prior to its introduction into the reducing-gas generator or admixed therewith and with the reforming medium in this chamber. In all cases it should be noted that the oxygen content of the reforming medium and the fed-back exhaust gas, and the carbon content of the hydrocarbon fuel should be maintained in a 1:1 atomic relationship. Thus, only the stoichiometric quantity of oxygen necessary to produce carbon monoxide with the carbon contained in the fuel is provided. The resulting reduction gas has been found to be practically free from oxygen and other oxidizing substances while the reducing-gas generator operates without formation of soot.

Since the reducing gas is free from oxidizing constituents, a high-quality iron sponge can be produced. In addition, it should be noted that recycling of the exhaust gas results in a reduction in the quantity of fuel necessary since this exhaust gas contains a substantial amount of carbon dioxide which, upon reaction with the hydrocarbon, produces an amount of carbon monoxide in excess of that which can be formed from an equal quantity of fuel with the aid of a reforming agent free from carbon dioxide. The exhaust gas also frequently contains some carbon monoxide and hydrogen which would otherwise be wasted as well as some hydro-carbon gas. The latter, of course, is also reformed into carbon monoxide and hydrogen and thus rendered useful for the reduction of the iron ore. The method of the present invention is substantially more economical than earlier methods as a consequence of the fact that the sensible heat of the exhaust gas is employed, on the one hand, to increase the rate of the reformation of the hydrocarbon and to heat the reducing-gas generator and, on the other hand, to regeneratively heat the reforming chamber. Moreover, the feed-back portion of the exhaust gas also provides energy for the reformation reaction in that part of its chemical-bonding energy is recovered.

Another advantage of the present invention resides in the fact that the proportion of the exhaust gases employed for regenerative heating and reaction with the hydrocarbon fuel can be so balanced that sufficient heating of the reducing-gas generators is effected while enough exhaust gas is provided to prevent soot formation upon reaction with the fuel, thereby resulting in reducing gases of high quality.

The above and other objects, features and advantages of my invention will be more fully apparent from the accompanying drawing in which.

Figure 1:
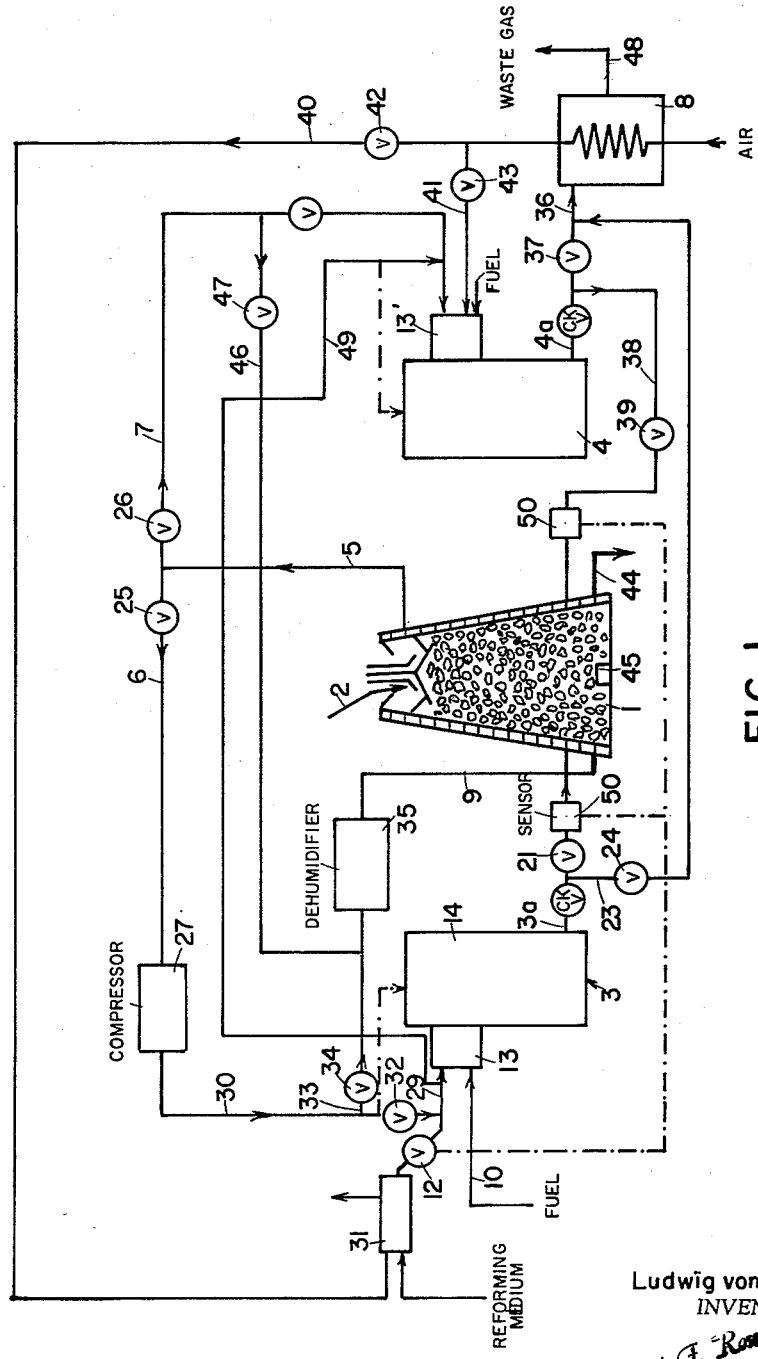
FIG. 1 is a flow diagram of a plant for the production of sponge iron according to the invention.
Figure 5:
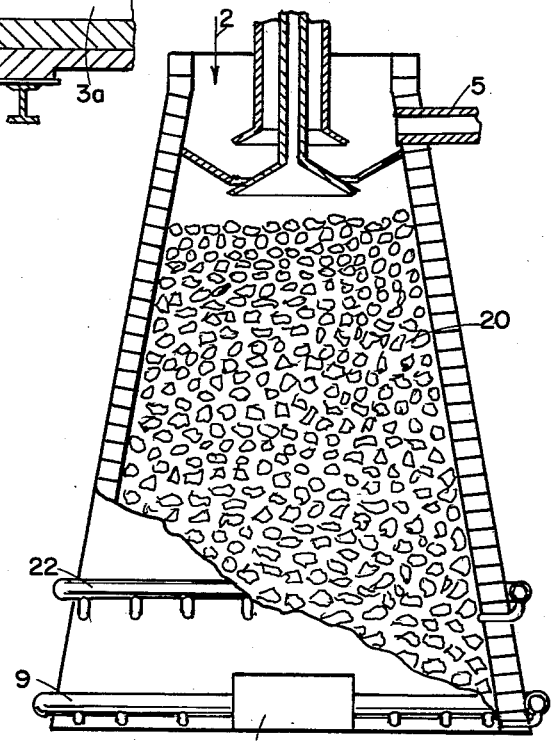
FIG. 5 is an axial cross-sectional view of an ore-reducing furnace, according to the invention.

In FIG. 1 I show a plant for the production of sponge iron from iron-oxide ore which comprises a cupola-type ore-reducing furnace 1 (best shown in FIG. 5) into which a charge 20 may be loaded via conventional skip-loading devices as indicated diagrammatically by arrow 2. A reducing-gas generator 3 has its outlet 3a branched to feed the reducing gas to the cupola 1 via a valve 21 and a conduit 22 while another conduit 23 and valve 24 serve to divert the flow of gas emanating from generator 3 to a heat-exchanger 8. The exhaust gases pass from the upper portion of the cupola 1 via a line 5 to the two branches 6 and 7. Valves 25 and 26 in these branches determine the relative quantities of the exhaust gases to be passed therethrough. The feed-back portion of the exhaust gas is conveyed via branch 6 to a compressor 27. The hydrocarbon stream passes via a line 10 into the primary-reaction chamber 13 of the gas generator 3 while the feed-back exhaust gas enters this chamber via a conduit 29 from a tube 30. The reforming medium which, in this case, is water vapor, is added by a line 12 via another heat exchanger 31 employing heated air from the exchanger 8. Tube 30 is provided with a valve 32 while a branch 33 of this tube includes a valve 34 for diverting a predetermined proportion of the exhaust gas to the cupola 1 as a cooling medium. This portion of the gas stream passes through a condenser 35 which lowers the dew point of this stream which then enters the cupola at its iron-discharge region via a conduit 9.

Another reducing-gas generator 4 has its outlet 4a similarly branched so that the efflux gas can pass, alternatively, into the heat exchanger 8 via a conduit 36 and a valve 37 and into the cupola 1 via tube 38 and valve 39. The hot air emanating from heat exchanger 8 may pass alternatively over a line 40 to the steam-forming device 31 or via line 41 into the primary-reaction chamber 13' of generator 4. The lines 40 and 41 are provided with respective valves 42, 43 for controlling the flow of fluid therethrough. From the reduction furnace 1 the iron sponge may be transferred, as schematically illustrated by arrow 44, to a cooling drum in which it is agitated in the presence of a cooling fluid.

In operation, a hydrocarbon fuel having a low carbon number (e.g. methane, ethane, propane, etc.) is introduced via line 10, with or without preheating, generally tangentially into the primary-reaction chamber 13 of generator 3 wherein it is admixed cyclonically with a reforming medium (i.e. water vapor) introduced via lines 12 and 29. This reaction chamber is maintained at a temperature of at least 1000° C. as will be apparent hereinafter, the injected gases being introduced under relatively high pressure to insure substantially complete mixing and reaction of the constituents. The reforming medium may be added at a rate of about 27 m.³ (S.T.P.) per hour with an approximate entrance velocity of 33 meters per second while the fuel gas enters the chamber at a rate of about 100 m.³ (S.T.P.) per hour with an approximate entrance velocity of 14 meters per second. The primary-reaction chamber 13 or 13' may have a length of approximately 500 mm., a wall thickness of 75 mm. and an inner diameter of 200 mm. Simultaneously, an exhaust gas is added to the reducing-gas generator via line 30 or to the secondary-reaction chamber 14 thereof as indicated by dot-dash lines. It is essential that the molar quantities of carbon and free oxygen added to the reaction chamber 13 be in a ratio of 1:1. Thus, when a fuel having substantially the formula $C_nH_{(2n+2)}$ is reacted in this chamber, the following stoichiometric relationships must be considered:

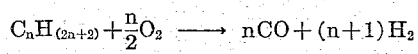

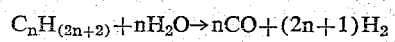

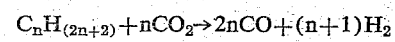

$$C_nH_{(2n+2)} + \frac{n}{2}O_2 \longrightarrow nCO + (n+1)H_2$$

$$C_nH_{(2n+2)} + nH_2O \rightarrow nCO + (2n+1)H_2$$

$$C_nH_{(2n+2)} + nCO_2 \rightarrow 2nCO + (n+1)H_2$$

It must, therefore, be pointed out that the total oxygen, water and carbon dioxide content has to be adjusted to maintain the 1:1 relationship previously set forth. The gas passing from the generator 3 into the cupola 1 via line 22 and valve 21 when valve 24 is closed consists of about 50–75% hydrogen and 35–15% carbon monoxide, the remainder being nitrogen. This reducing gas is free from oxidizing impurities and suitable for treating iron oxide.

The reducing furnace 1 (FIG. 5) is charged with briquettes, pellets or pieces of iron oxide which are progressively reduced as they flow counter-current to a rising, reducing-gas stream. The resulting sponge-iron mass is removed via a door 45 at the base of the furnace. The reducing gas is introduced at a level about 1 m. above this outlet in the reducing zone generally designated 46. When the charge consists primarily of $Fe_2O_3$, a sponge iron consisting of approximately 97% Fe and 2% carbon (the remainder being the usual accompanying impurities) has been obtained with the gas previously described. The exhaust gas from this furnace has a temperature of about 300° C., when, as is customary, the reducing gas has a temperature of at least 1000° C. and a composition of 71% hydrogen and 29% carbon monoxide. This exhaust gas also contains combustible matter having a recoverable heat of combustion ($\Delta H$) of about 2140 kcal. per cb. m. (S.T.P.). When water vapor is employed as the reforming medium in the generator, between 60 and 80% of the exhaust gas is diverted via valve 26 and line 7 to the primary reaction chamber 13' of the other generator 4 and serves to regeneratively heat the latter. In addition air, passing through the heat exchanger 8 in which it is raised to a temperature of about 600° C. by the waste gases leaving generator 4, enters the primary-reaction chamber 13' via line 41 and sustains combustion of the portion of the exhaust gas fed into this generator to heat the latter to a temperature in excess of 1000° C. It has been found that temperatures of about 1300° C. can thus be obtained in this generator.

A principal feature of the present invention resides in the alternate use of reducing-gas generators 3 and 4. To this end, valve 21 may be closed so that the output of generator 3 can be passed via line 23 and valve 24 to the heat exchanger 8 while the outflow of the latter proceeds via line 40 and valve 42 through the inlet 29 of generator 3 to supply preheated air thereto. Valve 43 is then closed. Similarly valves 25 and 26 alternate in function to now supply between 20 and 40% of the exhaust gas to generator 4 while generator 3 is preheated by combustion therein of 60 to 80% of the exhaust gas with the preheated air. From generator 4 the reducing gas passes via line 38 and valve 39 into the cupola 1 while valve 37 is closed. Likewise, valve 34 is closed while the cooling gas stream enters the condenser 35 via tube 46 and its valve 47. Th hydrocarbon fuel employed in conjunction with this example has a heat of combustion ΔH equal to 8580 kcal. per m.$^3$ (S.T.P.) and consists primarily of methane. The exhaust gas emanating from heat exchanger 8, via line 48, has an exit temperature of about 500° C. The reducing gases produced by the generators 3 and 4 which employ steam as the reforming medium fed thereto via lines 29 and 49, comprise about 29% carbon monoxide and 71% hydrogen and are at a temperature of about 1000° C. as previously mentioned.

A sensing device 50 is disposed in the reducing-gas line 22 to continuously analyse the reduction gas for water, carbon dioxide and methane, all constituents the presence of which is indicative of an unsatisfactory reaction in the generator 3 or 4. As soon as the water and/or carbon dioxide content rises above about 1%, the sensing device 50, via conventional servo devices, adjusts the valve 51 of the reforming-medium line 12 to reduce the proportion of this medium (i.e. oxygen or steam) fed to the generator 3. Upon a rise of, say, 2% in the hydrocarbon content in line 22, the sensing device adjusts this valve to increase the proportion of reforming medium.

Figure 2:
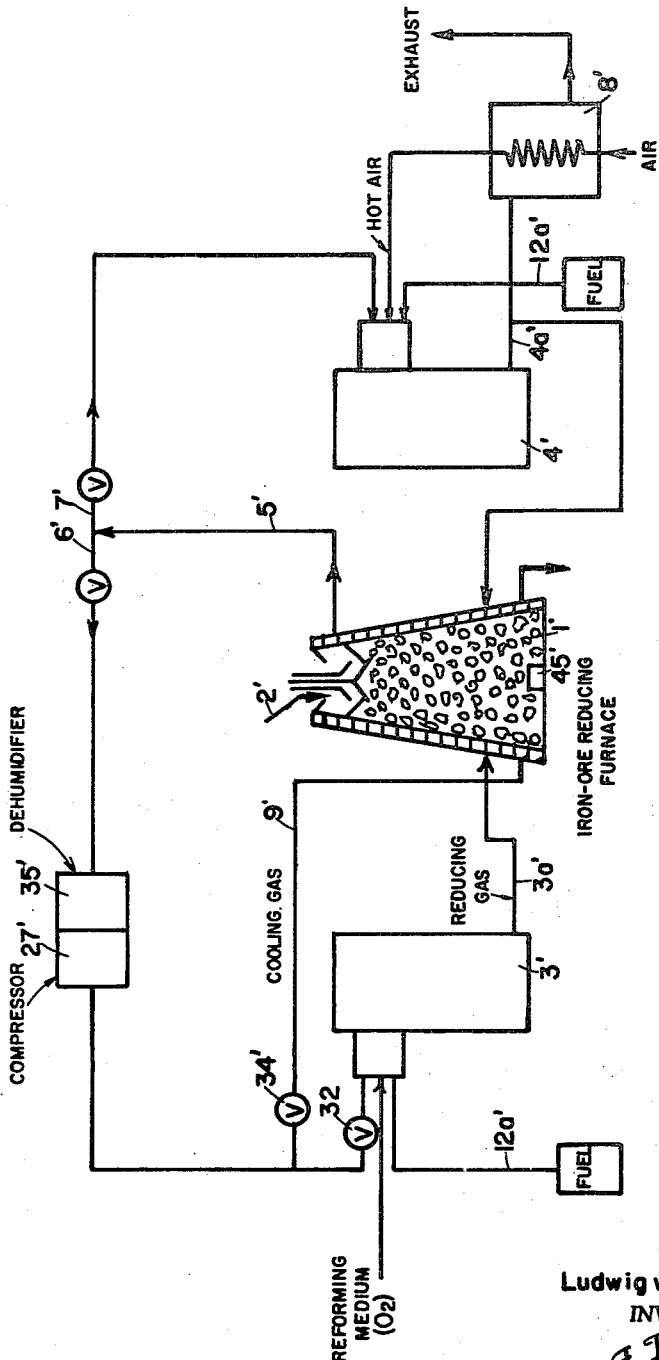
FIG. 2 is a flow diagram of a plant according to a modification.

In FIG. 2 I show a similar arrangement wherein, however, the lines 6' and 7', which branch the exhaust-gas stream passing through line 5' for delivering same to the reducing-gas generator 3' and the generator 4' to be heated, carry 60–75% and 25–40%, respectively, of the exhaust gas. In this case the reforming medium is oxygen which is introduced via line 11 in the form of air, air enriched with oxygen, or pure oxygen. The generators 3', 4' are also supplied with hydrocarbon fuel via lines 12a', 12b' while a cooling-gas stream passes via line 9' into the cupola 1' after initially traversing a condenser 35' in which its moisture content is lowered to a dew point of 35° C. and which cooperates with a compressor 27' for increasing the pressure of this gas. Valves 32' and 34' are provided, as described with reference to FIG. 1, for diverting at most 30% of the exhaust gas passing through line 6' into the cupola 1' for cooling the sponge-iron mass therein. With a predominantly methane fuel whose heat of combustion is approximately 8580 kcal. per m.$^3$, a reducing gas consisting of approximately 33% carbon monoxide and 67% hydrogen can be obtained at a temperature of 1000° C. when pure oxygen is employed. The exhaust gas passing into the generator 4' to be preheated has a heat of combustion of about 2140 kcal. per m.$^3$ and is at a temperature of approximately 300° C. The sponge-iron mass is cooled to a temperature of 300° C. by the cooling gas, whose ratio to the total volume of gas admitted to the cupola should at most be 30%, the remaining 70% being reducing gas. The sponge-iron mass has a composition of 90% iron, 2% carbon and 1% of the usual accompanying impurities. As previously noted, generators 3' and 4' can be alternately operated and to this purpose conduits and valves such as those clearly shown in FIG. 1 may be provided. Similar results are obtained when oxygen-enriched gases (i.e. containing at least 50% $O_2$) are employed as reforming media. These gases may, of course, be preheated in the heat exchanger 8' to a temperature of about 600° C. by the exhaust gases passing through generator 4' and emerging therefrom via line 4a' at a temperature of 1000° C.

Figure 3:
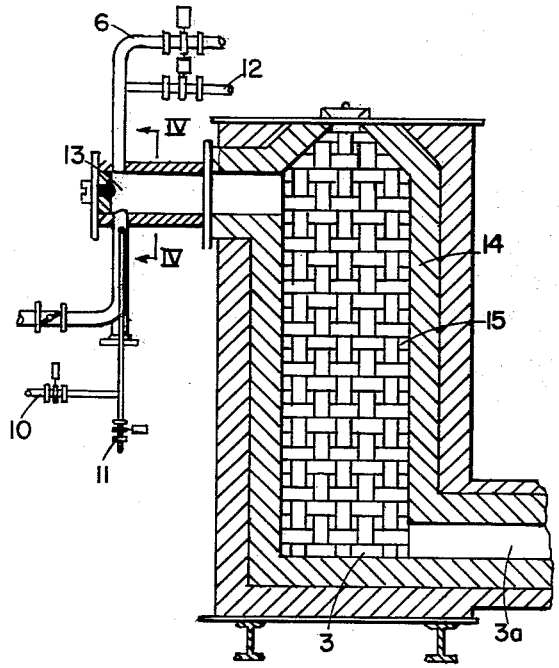
FIG. 3 is an axial cross-sectional view through a reducing-gas generator according to the invention.
Figure 4:
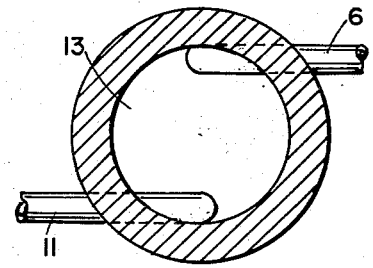
FIG. 4 is a cross-sectional view taken along the line IV—IV of FIG. 3.

In FIGS. 3 and 4 I show the reducing-gas generator 3 which is, of course, identical in all respects with the generator 4. The generators comprise a primary-reaction chamber 13 to which the hydrocarbon fuel and oxygen-containing reforming medium are added via the lines 10 and 11, respectively, while the exhaust gases and steam are added via lines 6 and 12. The tubes enter the primary-reaction chamber 13 generally tangentially, as may be seen from FIG. 4, to produce a turbulent cyclonic mixing therein as described in the aforementioned copending applications. From the primary-reaction chamber, the gases pass through the secondary-reaction chamber 14 which is provided with a lattice 15 of heat-retaining refractory blocks preheated in the previous cycle by combustion of exhaust gases, as described with reference to generators 4 and 4'. From the secondary-reaction chamber, the reducing gases pass via line 3a into the cupola shown in FIG. 5. This cupola has an inlet 9 for cooling gases substantially at the level of its outlet 45 while reducing gases can be admitted via the tuyères, schematically illustrated, at the extremities of conduits 22 and 48. These tuyères are located approximately 1 meter above the outlet 45 and the inlet tube 9.

I claim:
1. A method of operating a plant for producing sponge iron from iron ore in an upright shaft-type ore-reducing furnace with the aid of at least two reducing-gas generators, comprising the steps of:
  introducing said iron ore into said furnace at the top thereof and causing said iron ore to descend in said furnace countercurrent to a reducing-gas stream;
  reacting a hydrocarbon fuel with a substance selected from the group consisting of molecular oxygen, carbon dioxide and water vapor in said reducing-gas generator in a molar ratio of the oxygen of said substance to the carbon in said hydrocarbon of substantially 1:1 to produce said reducing gas consisting substantially completely of hydrogen and carbon monoxide;
  introducing said reducing gas into said furnace substantially at the bottom thereof so that said reducing gas converts said iron ore in said furnace to sponge iron while producing an exhaust gas rich in carbon dioxide and water vapor;
  diverting a portion of said exhaust gas to said generator for reaction with said hydrocarbon fuel whereby the carbon dioxide and water vapor of said portion constitute at least part of the quantity of said substance introduced into said generator; and
  regeneratively heating a further reducing-gas generator operable alternately with the first-mentioned reducing-gas generator to produce said reducing gas with the remaining portion of said exhaust gas.

2. A method of operating a plant for producing sponge iron and including an upright shaft-type ore-reducing furnace and at least one reducing-gas generator comprising the steps of:
  producing at a temperature in excess of 1000° C. in said generator by reacting a hydrocarbon fuel consisting primarily of methane with oxygen in a carbon/oxygen molar ratio of substantially 1:1 a reducing gas consisting primarily of hydrogen and carbon monoxide, said oxygen being in the form of a substance selected from the group consisting of molecular oxygen, water vapor and carbon dioxide;
  passing said reducing gas at a relatively high temperature upwardly through said furnace and reacting from a lower portion thereof with said reducing gas an iron-oxide ore introduced into said furnace at the top thereof to convert said ore to sponge iron and said reducing gas to an exhaust gas at a relatively low temperature comprising substantial quantities of oxygen-containing constituents including water vapor and carbon dioxide; and
  feeding between substantially 60% and 75% by volume of said exhaust gas directly from said furnace to said generator for reaction therein of said oxygen-containing constituents with said fuel to produce said reducing gas upon said oxygen being in the form of molecular oxygen, and between substantially 20% and 40% by volume of said exhaust gas upon said oxygen being in the form of water vapor.

3. A method as defined in claim 2, further comprising the steps of diverting a quantity equal to up to 30% by volume of said portion of said exhaust gas, reducing the water content of said quantity and thereafter introducing it into said furnace for cooling said sponge iron.

4. A method as defined in claim 3 wherein said furnace is provided with an inlet for said ore at an upper portion and an outlet for said sponge iron at a lower portion thereof, said exhaust gas being withdrawn from said furnace at said upper portion and said fraction of said exhaust gas being introduced into said furnace at a location in the region of said lower portion, said reducing gas being introduced into said furnace above said location.

5. A method as defined in claim 2 wherein said portion of said exhaust gas is compressed prior to admixture with said fuel.

6. A method as defined in claim 2 wherein said generator comprises a primary-reaction chamber and a secondary-reaction chamber connected to said primary-reaction chamber, further comprising the steps of turbulently mixing said substance with said fuel and partially reforming the latter in said primary-reaction chamber, and admixing said portion of said exhaust gas with the products of said primary-reaction chamber in said secondary-reaction chamber for completing the reforming of said fuel into a gas free from oxidizing agents and containing substantial quantities of hydrogen and carbon monoxide, the temperature in said generator being maintained in excess of about 1000° C. for production of said reducing gas.

7. A method as defined in claim 6 wherein said plant comprises at least two reducing-gas generators alternately operable to produce said reducing gas, at least one of said generators being supplied with said portion of said exhaust gas for reforming said hydrocarbon fuel while the other of said generators is supplied with the remainder of said exhaust gas, further comprising the step of burning said remainder of said exhaust gas in said other generator to heat the latter to a temperature in excess of about 1000° C. for sustaining a subsequent reforming reaction.

8. An apparatus for producing sponge iron comprising:
an upright ore-reducing cupola-type furnace;
two alternately operable reducing-gas generators adapted to reform a hydrocarbon fuel into a reducing-gas mixture consisting primarily of hydrogen and carbon monoxide;
means forming an inlet at an upper portion of said furnace for introduction therein of an iron-oxide ore and an outlet at the bottom of said furnace for sponge iron descending in said furnace;
first conduit means connecting said generators and said furnace for admitting said reducing-gas mixture thereto at a lower portion of said furnace;
second conduit means for removing an exhaust gas rich in oxygen-containing constituents from said furnace at said upper portion;
means including said second conduit means diverting a substantial portion of said exhaust gas to said generators for reaction with said fuel; first duct means forming part of said second conduit means communicating between one of said generators and said furnace for feedback of exhaust gas to said one of said generators whereby said one of said generators serves to produce said reducing gas, said second conduit means further including second duct means for conducting the remainder of said exhaust gas to said other generator for combustion therein to preheat said other generator; and dehumidifying means for reducing the water content of the remainder of said exhaust gas and feeding it to said furnace to cool said sponge iron.

9. An apparatus for producing sponge iron comprising:
an upright ore-reducing cupola-type furnace;
two alternately operable reducing-gas generators adapted to reform a hydrocarbon fuel into a reducing-gas mixture consisting primarily of hydrogen and carbon monoxide;
means forming an inlet at an upper portion of said furnace for introduction therein of an iron-oxide ore and an outlet at the bottom of said furnace for sponge iron descending in said furnace;
first conduit means connecting said generators and said furnace for admitting said reducing-gas mixture thereto at a lower portion of said furnace;
second conduit means for removing an exhaust gas rich in oxygen-containing constituents from said furnace at said upper portion;
means including said second conduit means diverting a substantial portion of said exhaust gas to said generators for reaction with said fuel, said second conduit means further including third conduit means for bypassing said generator and diverting a fraction of said portion of said exhaust gas to said lower portion of said furnace for cooling said sponge iron at said outlet;
compressor means for compressing said portion of said exhaust gas prior to its introduction into said generator and its return to said furnace; and
heat-exchanger means connected with said generators and heated by depleted gas emerging therefrom for heating a combustion-sustaining gas coupled with said other generator.

References Cited by the Examiner

UNITED STATES PATENTS

| | | | |
|---|---|---|---|
| 2,740,706 | 4/56 | Paull | 75—35 |
| 2,837,419 | 6/58 | Sellers | 75—35 |
| 2,931,720 | 4/60 | De Vaney | 75—35 |

FOREIGN PATENTS

| | | |
|---|---|---|
| 729,146 | 5/55 | Great Britain. |

DAVID L. RECK, *Primary Examiner.*